United States Patent Office 3,255,243
Patented June 7, 1966

3,255,243
PROCESS FOR THE CATALYTIC OXIDATION OF AROMATIC SUBSTANCES TO PRODUCE MONO- AND DICARBOXYLIC ACIDS
André Saur, Neuilly-sur-Seine, and Pierre Simonnin, Vanves, France, assignors to SOCATY, Montreuil-sous-Bois, France, a French company
No Drawing. Filed July 12, 1962, Ser. No. 209,299
Claims priority, application France, July 24, 1961, 868,771; June 18, 1962, 901,015
8 Claims. (Cl. 260—524)

The present invention is concerned with a process for the oxidation of aromatic substances which is of particular interest for the production of phthalic acids from xylenes.

It is known to oxidize aromatic alkylation products in liquid phase by bubbling through air under pressure of the order of 2 to 100 kg./cm.$^2$ and at a temperature of the order of 100 to 320° C. in the presence of an oxidation catalyst and of a solvent. A number of catalysts have been proposed for such an oxidation. Thus, U.S. patent specification No. 2,245,528 suggests the use of manganese acetate, as well as of the chlorides of cobalt, cerium and vanadium, alone or in admixture with the permanganates of cobalt or barium, the cobaltinitrite of sodium and the propionates, butyrates and acetates of barium, magnesium and potassium but suggests, more particularly, the mixture of cobalt acetate-manganese acetate. The salts of manganese are known as oxidation catalysts, regardless of the acid which enters into the constitution of the salt, as is pointed out by Paul Sabatier in his work, "La catalyse en chimie organique," Paris, 1920, and as a result of this it has been suggested to use, amongst others, the salts of manganese or of cobalt as catalysts. Thus, French patent specification No. 1,197,609 suggests the use of a catalyst composed of the chloride (or bromide) of manganese or cobalt or a synergistic mixture of the two, while its Addition No. 73,008 is concerned with a catalyst containing bromine and a metal, especially cobalt or manganese. Furthermore, French patent specification No. 1,158,830 is concerned with a catalyst composed of a mixture of the bromides of cobalt and manganese.

The use of a bromine compound, especially hydrobromic acid, is suggested for the oxidation of paraffins in the publication, "The Chemistry of Petroleum Hydrocarbons," Brooks, New York, 1955. Furthermore, very diverse solvents have already been used; thus, the above-mentioned U.S. patent specification No. 2,245,528 suggests the use of an organic acid (especially propionic, butyric, trimethylacetic, isobutyric, phenyl-acetic, methoxy-acetic), more especially acetic acid and preferably carbon tetrachloride and benzene. British patent specification No. 681,455 and U.S. Patent specification No. 2,723,994 suggest, on the other hand, the use of ortho-dichlorobenzene as solvent.

All these known processes have, in common, the inconvenience of a relatively long duration of reaction of the order of 20 hours and sometimes of a not very high yield.

The invention has for its object a rapid, catalytic oxidation process which gives high yields.

The process which forms the object of the invention consists of mixing the aromatic substance to be oxidized with synergistic solvent mixture containing at least one acid of the group consisting of acetic acid and/or its homologues and benzoic acid and/or its homologues and at least one benzenic substance, as well as with a synergistic catalyst mixture composed of the salts of at least one acid and of at least two metals, bubbling an oxygen-containing gas into this liquid mixture at a temperature between about 100 and 320° C. under a pressure at least equal to the vapor pressure of the mixture at this temperature until the aromatic substance is transformed into an oxidation product.

In the course of the oxidation of the aromatic substance, a loss of acetic or benzoic acid occurs due to oxidation into oxides of carbon, carbonic acid gas and water, as well as by evaporation and entrainment by the oxygen-containing gas in the course of the oxidation reaction. The oxidation products obtained with acetic acid are generally brownish whereas benzoic acid and its homologues yield directly products of sufficient purity so that all subsequent purification treatment should be unnecessary.

Benzoic acid is particularly advantageous because it also permits the avoidance of recovery operations and of distillation and saves the losses due to entrainment in such treatments. The boiling point of benzoic acid (about 250° C.) being much higher than that of acetic acid (about 118° C.), the evaporation losses of benzoic acid in the course of the oxidation are less significant than those of acetic acid. Furthermore, the benzoic acid process permits, when oxidizing a mixture containing a substance transformable, at least in part, into benzoic acid by oxidation, such as ethyl-benzene or toluene, the substantial compensation of the initial loss of benzoic acid by oxidation, by the formation of benzoic acid by the oxidation of ethyl-benzene or an analogue in the course of the reaction. This permits, after extraction of the oxidation product of the treated aromatic substance, the re-cycling of the solvent mixture and of the catalyst, without the fresh addition of benzoic acid, which is especially economical.

The aromatic substance may also be advantageously constituted by an industrial mixture of petroleum products containing a minor proportion of ethyl-benzene. The benzenic substance may be constituted by a benzene fraction of coal distillation, especially the so-called "technical benzene" fraction which consists essentially of a mixture of benzene and toluene.

The liquid mixture submitted to the oxidation may contain between 0.5 and 2.5 parts by weight of benzoic or acetic acid and between 0.5 and 2.5 parts by weight of the benzenic substance per part by weight of the aromatic substance.

The benzenic substance may be constituted by, at least in a major amount, a substance of the group consisting of benzene and its halogen derivatives.

At least one of the catalyst salts may be a salt of an acid of the group consisting of nitric acid, acetic acid and its homologues, benzoic acid and its homologues and halogen acids.

The catalyst may contain at least one salt of cobalt and one salt of manganese.

The solvent may contain at least one derivative of benzene and of a halogen and the catalyst at least one salt of the same halogen.

The oxygen-containing gas may be constituted, at least in a major amount, by air or oxygen.

If the aromatic substance is constituted, at least in a major amount, by a xylene, the oxidation product is a phthalic acid. With meta-xylene there is obtained by oxidation isophthalic acid, with ortho-xylene ortho phthalic acid and with para-xylene terephthalic acid, with toluene and ethyl-benzene benzoic acid.

The oxidation may be advantageously carried out under a pressure of the order of 20 to 40 kg./cm.$^2$.

Following is a description by way of example of methods of carrying the invention into effect.

*Example 1*

A mixture of 106 g. of meta-xylene, 90 cc. of acetic acid, 180 cc. of ortho-dichlorobenzene, 0.26 g. of cobalt acetate and 1.60 g. of manganese bromide is heated, in a stainless steel autoclave provided with an agitator, for 4 hours at 200° C. under a pressure of 25 kg., while bubbling through air at a rate of 700 litres per hour. There are obtained 151 g. of isophthalic acid, which corresponds to a yield of 91% (molar conversion).

For the purpose of comparison, the same operations are effected under the same conditions but on a known mixture in which the synergistic solvent, acetic acid-ortho-dichlorobenzene, is replaced by a known solvent consisting solely of acetic acid (272 g.). At the end of 4 hours, there are obtained 133.4 g. of isophthalic acid, which only corresponds to a yield of 80%.

*Example 2*

One operates as described in Example 1 but replaces the ortho-dichlorobenzene by an equivalent volume of benzene using a pressure of 30 kg./cm.$^2$. At the end of 2½ hours' reaction, there are obtained 149.300 g. of isophthalic acid, which corresponds to a yield of 90%.

*Example 3*

Under the same conditions as in Example 2, one treats 106 g. of meta-xylene mixed with 90 cc. of acetic acid, 180 cc. of benzene, 2 g. of bromobenzene, 0.26 g. of cobalt acetate, 1.04 g. of manganese acetate. There are obtained 122.5 g. of isophthalic acid, which corresponds to a yield of 74%.

For the purpose of comparison, one proceeds in the same manner with a known mixture of 106 g. of meta-xylene, 272 g. of acetic acid, 0.26 g. of cobalt acetate and 1.04 g. of manganese acetate. Only 17.5 g. of isophthalic acid are obtained which only corresponds to a yield of 10.5%.

*Example 4*

One operates under a pressure of 25 kg., with the same conditions as before, on a mixture of 106 g. of meta-xylene, 180 cc. of ortho-dichlorobenzene, 90 cc. of acetic acid, 1.04 g. of manganese acetate, 0.26 g. of cobalt acetate. 21 g. of isophthalic acid are obtained, which corresponds to a yield of 12.6%.

*Example 5*

One operates under the same conditions as in Example 4 but replacing the ortho-dichlorobenzene by benzene. The yield is 22 g. of isophthalic acid, which is 13.25%.

*Example 6*

One operates under a pressure of 40 kg., again in the same manner, on a mixture of 3.65 g. of ethyl-benzene, 83.90 g. of meta-xylene, 16.15 g. of para-xylene, 2.30 g. of ortho-xylene, 90 cc. of acetic acid, 180 cc. of benzene, 1.60 g. of manganese bromide and 0.26 g. of cobalt acetate. At the end of 4 hours, there are obtained 125.300 g. of a mixture of phthalic acids, which corresponds to a yield of 80% based on the meta-xylene and para-xylene.

*Example 7*

One treats, in the same manner, a mixture of 106 g. of meta-xylene, 90 cc. of acetic acid, 180 cc. of benzene, 1.20 g. of manganese acetate and 1.10 g. of ammonium bromide. 135.400 g. of isophthalic acid are obtained, which corresponds to a yield of 81.5%.

For the purpose of comparison, one operates in the same manner on a known mixture by replacing the benzene by an equivalent volume of acetic acid. There are only obtained 127.5 g. of isophthalic acid, which corresponds to a yield of 76.5%.

*Example 8*

530 g. of an industrial mixture based on meta-xylene (resulting from the distillation of petroleum products and consisting of 406 g. of meta-xylene, 85.9 g. of para-xylene, 24.15 g. of ortho-xylene and 13.95 g. of ethyl-benzene), with 915 g. of benzoic acid, 900 cc. of benzene, 25 g. of bromo-benzene, 1.3 g. of cobalt acetate and 5.3 g. of manganese acetate, are heated under reflux for 2 hours at 200° C. in a cylindrical reactor, made of non-oxidizable material, of 50 mm. diameter and 5 litres capacity, under a pressure of 30 kg., while bubbling in air at a rate of 1500 litres per hour. There are thus obtained 695 g. of pure phthalic acids which are extracted by hot filtration and which corresponds to a yield of 90% based on the meta-xylene and para-xylene treated. The mother liquors of the filtration contain 930 g. of benzoic acid which represents 1.6% more than the quantity originally used. This excess practically compensates for the losses of working up and these mother liquors may be re-used, after elimination by evaporation of the water formed during the reaction, for a new oxidation operation on a new charge of the same industrial mixture.

The phthalic acids thus obtained and dried are of a white color and of great purity.

For the purpose of comparison, one operates in the same manner on a known mixture obtained by replacing the benzene by an equivalent volume of benzoic acid. Under the best conditions, the yield does not exceed 75%.

*Example 9*

A mixture of 530 g. of meta-xylene, 915 g. of benzoic acid, 900 cc. of benzene, 25 g. of bromobenzene, 1.3 g. of cobalt benzoate and 5.2 g. of manganese acetate is oxidized in 4 hours in an autoclave at 200° C. and under a pressure of 30 kg. by the passage of 1500 litres of air per hour. There are thus obtained 750 g. of pure phthalic acid, which corresponds to a yield of 90%.

*Example 10*

One operates as in Example 9 but with 400 g. of acetic acid and 400 g. of benzoic acid in place of the 915 g. of benzoic acid and one obtains an identical yield.

*Example 11*

One operates as in Example 9 but with para-xylene in place of meta-xylene and with manganese benzoate in place of the acetate, in the same proportions, and one obtains an equivalent yield of terephthalic acid.

*Example 12*

When operating as in Example 9 but at 225° C. and under a pressure of 40 kg. and with ortho-xylene in place of meta-xylene and of ortho-dichlorobenzene in place of benzene, there is obtained ortho-phthalic acid in an equivalent yield.

*Example 13*

With ethyl-benzene in place of meta-xylene and operating under the same conditions and with the same proportions as in Example 9, there is obtained benzoic acid in a yield equal to 90%.

*Example 14*

The operations of Examples 9, 10, 11 and 12 are repeated but replacing the benzene by an equivalent quantity of "technical benzene" from the distillation of coal constituted by a mixture of 95% benzene and 5% toluene. The proportion of toluene in this benzene, which is oxidized at the same time as the xylene, provides a quantity of benzoic acid which compensates for the losses in the course of the working up, while the mixture recovered after extraction of the phthalic formed is recycled.

It is to be understood that the invention is not limited to the examples described; it is capable of numerous variations known to one skilled in the art according to the application envisaged, without departing from the spirit of the invention.

We claim:

1. In a process for producing an aromatic acid by catalytic oxidation of an aromatic compound selected from the group consisting of m-xylene, mixtures of O-, m- and p-xylenes, and ethylbenzene, comprising the steps of:

preparing a liquid mixture of said aromatic compound with a catalyst in a solvent mixture and bubbling an oxygen containing gas through said liquid mixture at a temperature of 100° to 320° C. and under a pressure not lower than the vapor pressure of said liquid mixture at said temperature, the improvement which comprises providing as the solvent a synergistic solvent mixture consisting of (1) at least one acid selected from the group consisting of acetic acid, benzoic acid and their homologues, and (2) at least one benzenic compound selected from the group consisting of benzene, ortho-dichlorobenzene, ethylbenzene, bromobenzene and a mixture consisting of about 95% benzene and about 5% toluene, and said catalyst mixture consisting of the salts of manganese, and at least one member selected from the group consisting of cobalt and ammonium, and of at least one acid selected from the group consisting of acetic acid, hydrobromic acid and benzoic acid and the relative proportions of acid and of benzenic compound in said synergistic solvent mixture each being between 0.5 to 2.5 parts by weight per part of aromatic compound by weight.

2. The process of claim 1, wherein said synergistic solvent mixture consists of acetic acid, benzene, and ethylbenzene.

3. The process of claim 1, wherein said synergistic solvent mixture consists of benzoic acid, benzene and bromobenzene.

4. The process of claim 1, wherein said synergistic solvent mixture consists of acetic acid, benzene, and bromobenzene.

5. The process of claim 1, wherein said synergistic solvent mixture consists of benzoic acid, acetic acid, benzene, and bromobenzene.

6. The process of claim 1, which said synergistic solvent mixture consists of acetic acid, ortho-dichlorobenzene, and bromobenzene.

7. The process of claim 1 for producing isophthalic acid, wherein said aromatic compound is meta-xylene.

8. The process of claim 7 in which the catalyst is a mixture of cobalt acetate and manganese acetate.

References Cited by the Examiner
UNITED STATES PATENTS

| | | | |
|---|---|---|---|
| 2,245,528 | 6/1941 | Loder | 260—524 |
| 2,723,994 | 11/1955 | Haefele et al. | 260—524 |
| 2,833,816 | 5/1958 | Saffer et al. | 260—524 |
| 2,874,098 | 2/1959 | Appell | 260—524 X |
| 2,963,509 | 12/1960 | Barker et al. | 260—524 |
| 3,082,250 | 3/1963 | Baldwin et al. | 260—524 |

FOREIGN PATENTS

| | | |
|---|---|---|
| 736,821 | 9/1955 | Great Britain. |
| 840,009 | 7/1960 | Great Britain. |

LORRAINE A. WEINBERGER, *Primary Examiner.*

LEON ZITVER, *Examiner.*

M. S. JAROSZ, L. A. THAXTON, *Assistant Examiners.*